Feb. 22, 1949.  G. G. MOZZANINI ET AL  2,462,120
SPEED CONTROLLING MEANS FOR DIRECT CURRENT MOTORS
Filed April 11, 1945  3 Sheets-Sheet 1

INVENTORS
Georges Gabriel Mozzanini
Maurice Lebertre
BY George H. Cooley
ATTORNEY Feb. 22, 1949. G. G. MOZZANINI ET AL 2,462,120
SPEED CONTROLLING MEANS FOR DIRECT CURRENT MOTORS
Filed April 11, 1945 3 Sheets-Sheet 3

Fig 4

INVENTORS
Georges Gabriel Mozzanini
Maurice Lebertre
BY George H. Corey
ATTORNEY Patented Feb. 22, 1949

2,462,120

UNITED STATES PATENT OFFICE 2,462,120

SPEED CONTROLLING MEANS FOR DIRECT CURRENT MOTORS

Georges Gabriel Mozzanini, La Garenne Colombes, and Maurice Lebertre, Neuilly-sur-Seine, France Application April 11, 1945, Serial No. 587,712
In France December 15, 1941

Section 1, Public Law 690, August 8, 1946
Patent expires December 15, 1961

6 Claims. (Cl. 318—259)

Our invention has for its object improvements in D. C. motors, particularly applicable to those wherein the modifications in speed are produced by modifications brought to the field. Our invention has also for its object improvements in the control apparatus for such D. C. motors and more generally various important improvements brought to the operation of said motors.

In its broadest aspect our invention relates to a method of machining at high speed by causing the tool to enter and leave the work piece at a speed much lower than the cutting speed.

The invention is particularly designed for the rapid and efficient operation of a machine tool, such as a planer, in which the novel method of machining disclosed herein is employed. In the past, it has been the practice to operate a machine tool at a slow speed throughout the cutting stroke since a low speed was necessary for the initial formation of a continuous chip in the surface of the work being machined and for terminating said chip at the end of the stroke without damage to the work surface or the cutting tool. Much greater efficiency is achieved by the employment of a new machining cycle, herein referred to as the Berthiez cycle, in which the tool is caused to enter and leave the work at a low speed but is driven at a very high speed throughout the balance of the cutting stroke. The preferred apparatus for employing the Berthiez cycle is a planer driven by a D. C. motor whose speed is controlled by varying its field excitation or the field excitation of a generator supplying it with armature current or by otherwise varying the armature voltage. The fast cutting speed, herein referred to as cutting speed, and the even more rapid speed, herein referred to as the fast speed, used for a non-cutting return stroke or for non-cutting portions of the cutting stroke are both controlled by a pair of adjustable resistances, which may be the portions of a single resistance which are selected by a pair of sliders. It is necessary, however, that such a planer, or any other machine employing the Berthiez cycle, be equipped with means for rapidly and accurately decelerating the motor from cutting speed to a low speed at which the tool may safely exit from the work without damage to itself or the work surface. In the past, when it was desired to decelerate the D. C. motor driven tool from a higher speed to a lower speed, it has been the custom to make a single change in the speed controlling resistance from a resistance value corresponding to the higher running speed to a resistance value corresponding to the lower running speed. When this is done, however, deceleration is relatively slow and occurs over a length of travel which depends upon the higher running speed. It is an object of this invention, therefore, to provide control means for a D. C. motor driven machine tool which will decelerate the motor from cutting speed to a safe tool exit speed in a very short time and within a travel distance which is the same regardless of the magnitude of cutting speed (within a wide range).

Another object of this invention is to provide an electro-mechanical system suitable for applying the Berthiez cycle method of machining to a series of work surfaces, for instance, to two or more work pieces, mounted on a planer table. It is desirable, in such cases, that the tool be driven at fast speed between two successive work surfaces. It is ncessary, however, to provide for a rapid and accurate deceleration from cutting speed to a safe tool exit speed at the end of the first cut, and also from fast speed to a safe tool entrance speed at the beginning of the second cut. The invention provides means for decelerating very quickly, to the low speed needed momentarily for safe tool exit and entrance.

A further object of the invention is to provide an electro-mechanical system for controlling a reciprocating machine employing the Berthiez cycle. It is necessary, in such a reciprocating machine, that the reciprocating part be decelerated to a stop at precisely the same reversal point after each stroke. The invention, therefore, provides for a series of deceleration steps, the first of which is a function of the speed of the machine before deceleration.

Still a further object of the invention is to provide an electro-mechanical system for reducing the time required for a D. C. motor and its driven part to accelerate from standstill or from an initial speed to a higher operating speed.

According to a further feature of our invention, we also improve the braking which becomes swifter, this being done in a manner such that the part driven by the motor stops at a distance which is practically constant from the point corresponding to the opening of the circuit whatever the previously reached speed may have been. This results in ensuring both accuracy in the stopping and independence of the length of stroke of the motor driven part with reference to the speeds used for operation. This accuracy obtained for the stopping allows in particular the addition to the machine or apparatus driven by the motor considered of a path indicator whereby an adjustment of said machine or apparatus may be made once and for all whatever the conditions of operation and the speed used may be. Moreover the energy-recovering braking system used allows a substantial economy in current to be made, chiefly in the case of a succession of speed reversals and of frequent startings.

According to a further feature of our invention, the influence of the heating of the electric apparatuses on the operation of the motor considered is reduced, said heating affecting chiefly the length of the braking distance and the speeds obtained for reduced field values; this improvement furthers thus also the accuracy in the stopping the conditions of which are rendered as constant as possible.

Our invention also covers means for executing very small strokes of the motor-controlled parts without any abnormal stress being laid on the electrical apparatus, this being provided by means of a special arrangement designed for the speed-reversing means.

According to a still further feature of our invention, we limit automatically the maximum speed which may be used for small strokes in a manner such that for such small strokes it is no longer possible to begin braking while the motor is still at its maximum starting intensity.

Moreover, according to our invention, we obtain a very high safety in operation for the motor in the case of a sudden stoppage of current supply, of a slow decline in voltage, of an error made in service and the like; thus, in these different cases the braking is efficiently ensured and the machine controlled by the motor cannot continue running blindly on.

Furthermore, according to a still further feature of our invention, the rheostat of the motor is given a graduation in accordance with the possible scale of speeds whereby said rheostat may be adjusted without any hesitation, for the speed which it is desired to obtain.

Lastly, in accordance with yet another feature of the invention, automatic variations in speed during operation may be provided for the motor so as to obtain, at predetermined points in the path of the part driven by the motor, the desired speeds and successions of speeds, this being provided by the positioning of adjustable stops or tappets and through the use of a plurality of adjustable slides on a common rheostat.

Further advantageous features of our invention will appear from the reading of the following description and from the examination of the appended corresponding drawings showing several forms of execution of our invention together with a number of curves relating to the operation of the motor as improved in accordance with our present invention, said curves being accompanied for comparison by curves relating to the operation of motors provided with control means of the type generally used.

We will examine in succession the various aspects of the improvements brought, in conformity with our invention, to the speed control system for motors, reversible or not, the speed of which is field-controlled, with a view to obtaining the results disclosed hereinabove. We will then describe, by way of example, the general arrangement of an automatic system including means for applying the different said improvements.

We will refer often hereinafter, by way of example, to the control of machine-tools and in particular of planing machines; but it should be well understood that the D. C. motors with a field-controlled speed, as improved in accordance with our invention, may be used for controlling any other machine or apparatus, chiefly a reciprocating machine or apparatus adapted for operation in either direction or else a machine having a very variable speed as occurs in the case of the control of a rolling-mill, an extraction machine, a lift, a printing machine, a paper mill, a textile machine and the like.

As concerns planing, for instance, it is well known that the maximum speed applicable for cutting a given metal is for the greater part limited by the resistance of the tool edge to the shocks received when engaging the work. Consequently as soon as the tool has entered the part to be machined, it is possible to increase the speed of cutting without any damage for the tool, which substantially increases the efficiency of the machine as the planing cycles are executed more rapidly for a constant production per cycle.

Similarly, for limiting the elastic action of the release of the tool edge as it passes away from the work and also the extrusion of material out of the latter as would occur if the tool were to end its cutting operation too rapidly, it is of interest to adopt a reduced speed at the end of said cutting operation.

These two modifications in the cycle, viz, acceleration of the tool after its engagement with the work and its slowing down before it disengages the tool, form the novel features of what we will term the Berthiez cycle. This cycle is also applicable to any similar machining operation.

Figures 1, 3, 5:
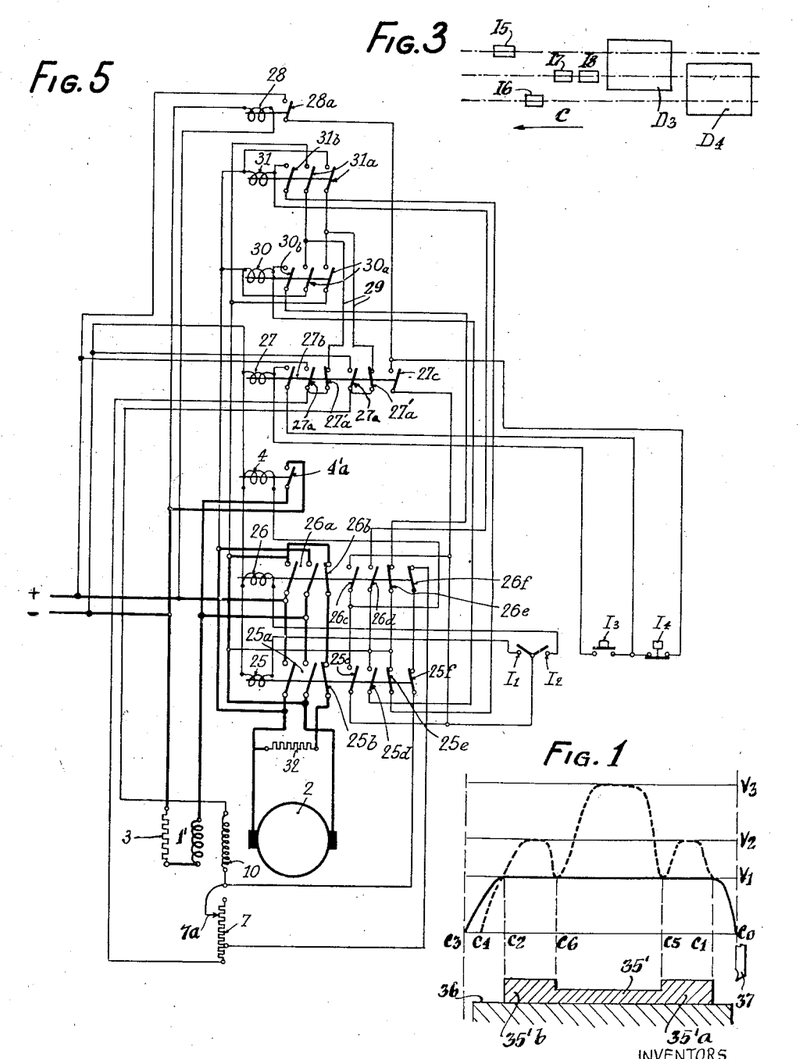
Fig. 1 is a graphical representation of one application of our new method of machining.
Fig. 3 is a plan view of a conventional control means used in connection with Fig. 2.
Fig. 5 is a wiring diagram for a protective system for use with an electrically driven machine tool.

In Fig. 1 we have shown the advantages and particular features of the cycle considered. The diagram shown in said figure indicates the speed V of a work piece while it is being machined, as a function of the stroke C of operation on a planing machine. Underneath this diagram, we have illustrated very diagrammatically the work 35 during machining, as carried by the table 36, the cutting tool being also shown at 37.

Normal operation would be performed in accordance with the full lined outline at the speed $V_1$. The operation according to the Berthiez cycle is shown in dotted lines on the same diagram.

As apparent, the part to be machined is engaged at the speed $V_1$ after it has travelled over a path $c_0$—$c_1$. As soon as the work is engaged at $c_1$, the speed is increased up to the value $V_2$, which may be superior to $V_1$ by 50 to 100% and more, according to the nature of the work and of the tool and according to the brittleness of the latter. The speed $V_2$ is lowered at the end of the cutting operation in a manner such that when the tool moves away from the work at $c_2$ the speed is brought down again to the value $V_1$ admitted for normal operation.

As also apparent, the elongation of the stroke ends at $c_4$ instead of $c_3$ which for a given useful path $c_1$—$c_2$ reduces the entire stroke by a distance $c_3$—$c_4$.

There is another case in the planing operation for which it is of interest to produce modifications in speed during the execution of the stroke. Thus, for instance, a planing machine may have to machine projections or bosses which are comparatively distant from one another, as shown underneath the diagram of Fig. 1 where the work piece to be machined 35', carried by the table 36, is provided with bosses 35'a and 35'b lying at a distance from one another and submitted to the action of the tool 37.

In such a case, the stroke in the return direction will be performed at uniformly high speed. In the cutting direction it is necessary to retain the speed adjusted for cutting only during the machining operation proper of the bosses and to use between the bosses the high speed applied for the return stroke.

We have shown in Fig. 1 the variations of the speed of advance of the work piece during operation as a function of the path travelled over. The full-line curve indicates the speed of cutting during normal operation as performed heretofore. The dotted line curve illustrates the operation as recommended with an acceleration between the bosses and the application of the Berthiez cycle for the machining of each boss.

As may be noted from Fig. 1, engagement and disengagement of the tool with reference to each boss to be machined are executed at the speed $V_1$ normally admitted heretofore for cutting operation, while the speed of machining the bosses is accelerated immediately after engagement in conformity with the Berthiez cycle up to a speed $V_2$ and reduced again to the speed $V_1$ for disengagement. The speed $V_3$ attained between the bosses preferably is greater than the cutting speed and may, for example, be the speed suitable for the return stroke.

The machining during a single stroke of juxtaposed parts is readily practicable in a similar manner.

We have shown in Fig. 5 the wiring diagram of the automatic stop and braking arrangements adapted to operate in case of lack of voltage.

The improvements to be described hereinafter relate to the general case of a motor with an independent excitation. In the case of a lack of voltage for any reason whatever such as a cut-out, a sudden break in the circuit, a slow fall in voltage, faulty control or the like, the excitation of such a motor generally fed from the mains is cut off and electrical braking of the motor becomes impossible under such conditions.

Such a drawback may be very serious if the motor drives for instance a system the immediate stopping of which may be necessary such as a hoisting or weight-handling apparatus or else a system which requires accurate stopping, such as a lift or a goods-elevator or again a system with an electric motion reversing device requiring an accurately defined stroke such a reciprocating machine-tool, a planing machine and the like. In this case, the drawback mentioned may form a real danger because such machines have normally no other braking means outside the electric braking and the failing of the latter produces of necessity a misadjustment in the length of the stroke, which results in multiple and most serious consequences: the machine continues running blindly until it has totally absorbed the kinetic energy accumulated in the moving masses in particular in the rotor of the motor, unless an accident previously puts an end to this running such as the abutting of a carriage at the end of its stroke in a canting machine or the action of an uncontrolled drive in a rack-actuated planing machine.

In the following paragraphs, we will describe the improvements brought to the auxiliary appliances for the motor, in accordance with our invention, as applied to the control means of a planing machine, for instance, said control means including an independent field excitation and a motion reversing device acting through a reversal of the current passing through the motor armature.

It must, however, be understood that the improvements to be disclosed hereinafter are applicable to the control of any machine or apparatus as stated hereinabove.

In accordance with our invention, the excitation of the motor is, in case of a sudden or progressive lack of voltage, cut off from the mains but is restored through the terminals of the motor. To this end, a voltmetrical relay ensures the transfer of the excitation to the armature, while at the same time it produces the release of the operation-controlling switches. A set of pilot reversing-switches selects the connection with the armature in a manner such as to keep the direction of the excitation constant whatever the direction of rotation of the motor, i. e. the direction of the armature current may be.

As apparent from Fig. 5, the relays 25 and 26 have their control coils arranged in the control circuit while the contacts 25a and 26a are inserted in the feed circuit of the armature 2 of the motor. These relays are selectively controlled by the automatic motor reversing control switch $I_1$—$I_2$. If the contact $I_1$ of this reversing switch is closed, the contact $I_2$ being then inoperative, the corresponding coil 25 will be energized and close the contact 25a whereby current will be sent through the armature 2 in a direction corresponding for instance to forward motion. If, on the contrary, the contact $I_2$ of the reversing switch is closed, the contact $I_1$ being then inoperative, the coil 26 will be energized and the contacts at 26a will be closed whereby the energization current will pass through the armature 2 in the opposite direction corresponding for instance to rearward motion.

The energization of these relay coils 25 and 26 cannot, however, be performed unless the contacts 27c and 28a to be described hereinbelow are closed.

In the same control circuit, Fig. 5, as the relay coils 25 and 26 is inserted the acceleration relay coil 4; said coil 4, when energized, closes its contact 4a whereby the starting resistance 3 is short-circuited.

It should be noticed that the energization of the coil 4 is controlled by the contacts 25c and 26c submitted to the action of the coils 25 and 26 for forward and reverse operation. In other words, this coil 4 cannot be energized unless either of the relay coils 25 or 26 is energized.

Moreover, the relay coil system 4, 25, 26 is controlled by the contact 27c submitted to the action of the coil 27 also inserted in the control circuit.

The relay coil 27 will be termed the operation-preparing relay and closes through the contacts 27a the circuit normally feeding the energizing coils. This means that when the coil 27 is energized the contacts 27a are closed and the field excitation coil 10 is fed from its normal source.

When the relay coil 27 is not energized, the contacts 27a open and the contacts 27'a rigid with the latter are closed, whereby the field excitation coil 10 is fed from the motor armature itself through the agency of the wires 29 and the contacts 30a or 31a to be described hereinafter.

The contact 27c controlled by the same coil 27 serves to show whether the motor energization is fed normally through the contacts 27a before any energization of the forward operation coil 25 or of the rearward operation coil 26, i. e. before the armature is fed.

Moreover the relay 27 is energized only after the knob or push-button I3 is pressed down to initiate operation, the stop knob or push-button I4 being closed. Said relay coil 27 is also self-energized by means of the holding contact 27b which closes as soon as the coil 27 is energized, by reason of the pressing down of the push-button I3. The relay 27 may then be released by hand-operation of the stop push-button or switch I4.

The whole arrangement of relay coils 25, 26, 4 and 27 inserted in a common control circuit is submitted to the action of the current-breaker 28a which is operated to closed position when relay coil 28 is energized and is opened when the relay coil 28 is itself inoperative or deenergized through the voltage falling to a minimum. Said relay coil 28 is inserted shuntwise between the two feed wires for the armature 2 and acts as described in case of a lack of voltage for any reason whatever.

As apparent from Fig. 5, there are arranged in parallel with the armature 2, two switch-controlling coils 30 and 31 adapted to operate in correspondence with the direction of operation. Through the contact-pieces 30a and 31a controlled by said coils, they select in accordance with the direction of rotation of the armature the correct direction for the feeding of the field from the armature in case of a lack of voltage in the supply. Thus the direction of the current through the field remains constant whatever the direction of the armature current may be. This feeding of the field in case of a lack of voltage is performed through reclosing of the two normally closed contacts 27'a controlled by the coil 27, upon deenergizing coil 27 controlled in its turn by the relay coil 28 as explained hereinabove.

The selecting relay coil 30 is energized by the closing of the contact 25d controlled by the forward motion relay coil 25. As soon as said contact 25d is closed through energization of the coil 25, the coil 30 of the selecting relay is self-energized through its holding contact 30b until the contact 26e which is normally closed opens, this opening occurring when the reverse motion relay coil 26 is energized in its turn. The contact 26e is arranged in series with the contact 30b.

Thus the relay coil 30 remains fed with current during the braking period after deenergization of the forward motion relay, i. e. after opening of the contact 25d. Said deenergizing is caused either by the normal reversal of the motor reversing control switch I1, I2 or by operation of the low voltage relay 28 when actuated by a fall or lack of voltage in the main supply. Thus the coil 30 remains energized from the armature by means of the closed contacts 30b and 26e. The contacts 30a, therefore, remain closed and allow the field to be fed. Because of the deenergization of the relay 27 which is caused in its turn by deenergizing of the relay 28 which opens the contact 28a, current may flow from the armature in the proper direction through the contacts 27'a which are then closed by reason of the abovementioned deenergization of the relay 27.

The braking is performed by the armature winding 2 being closed over the braking resistance 32 inserted in series with two switches 25b and 26b controlled respectively by the coils 25 and 26 for forward and for rearward operation. These switches 25b and 26b are normally closed when neither coil 25 nor coil 26 is energized, for instance by reason of the contact 28a of the relay 28 opening.

The rapid braking of the armature 2 and the self-induction of the field winding 10 provide a stopping of the motor before the excitation current through the field has fallen to an insufficient value to be effective for braking action, in spite of the rapid decrease of the voltage at the terminals of the armature 2 feeding said winding.

The operation of the selecting relay 31 energized by the closing of the contact 26d of the rear motion relay 26 is similar to that which has been described hereinabove for the selecting relay 30.

The circuits feeding the relay coil 31 are arranged in parallel with those feeding relay 30 and include respectively the contact 26d, and the self energizing contact 31b with the contact 25e opening under the action of the relay coil 25.

It is apparent, from the above and from the arrangement as discribed with reference to Fig. 5 that there is provided, due to the improvements which form the object of our invention, a great reliability in operation, in particular for the braking which is ensured even in the case of fall or lack of voltage.

Figure 2:
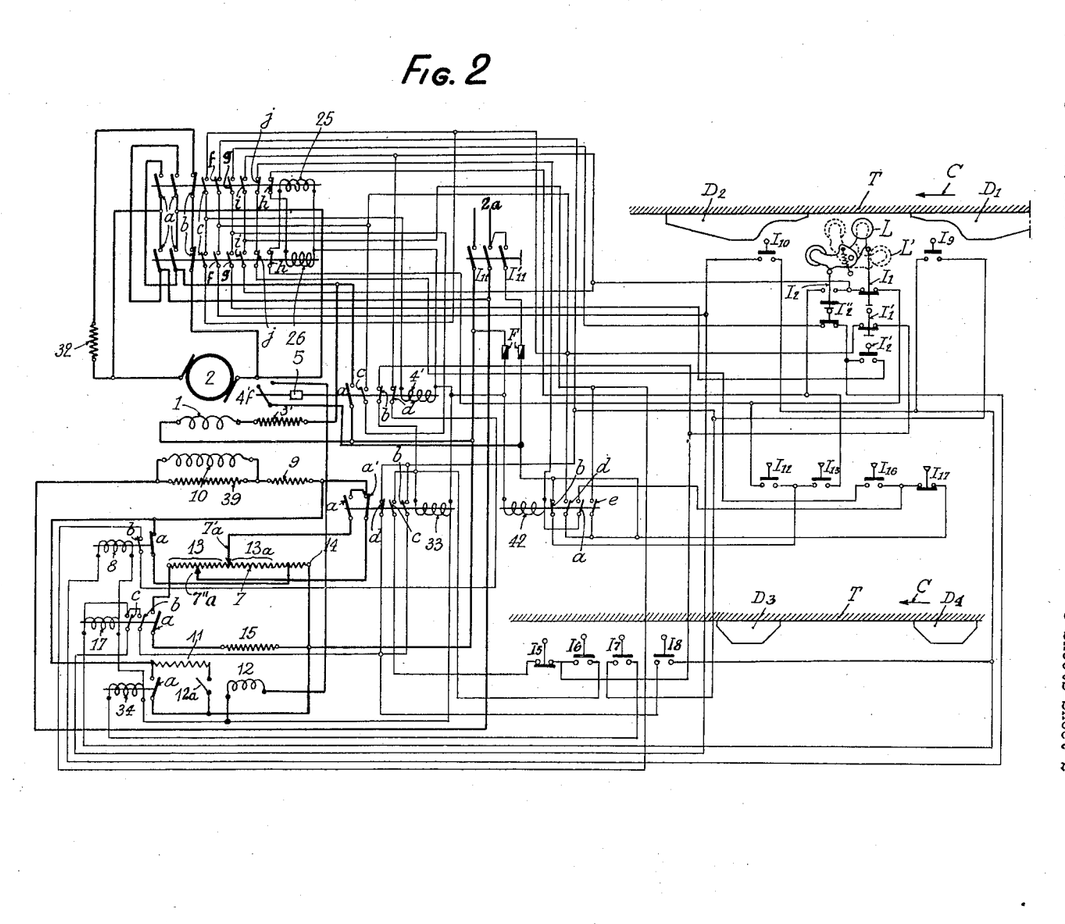
Fig. 2 is a wiring diagram for an electrical apparatus for performing the Berthiez cycle.

In Fig. 2 is shown a motor 2 receiving power from a power source 2a through a power circuit shown in heavy lines. The acceleration, deceleration, reversal, manual operation, and selection between the manual operation and automatic operation are controlled through relays 4, 8, 17, 25, 26, 33, 34, 42 by various switch gear I which are elements of a control circuit shown in light lines. The principal power switches I11 and I'11 are operated by hand to connect the machine power and control circuits, respectively, to a source of power. Fuses F are provided in the control circuit. Manual switches I12, and I13 are used for cutting and return strokes, respectively, when it is desired to operate the machine manually, as will be explained hereinafter. The machine is started in automatic operation by switch I16; automatic operation is terminated by means of switch I17.

Switches I1 to and including I10 are operated by the movable part, in this case, a planer table T. When the machine is in motion it is caused to reverse at the end of the cutting stroke by dog D1 (which actuates switces I9, I1, I'1, I'2, I2, I''2) and at the end of the reverse stroke by dog D2 (which actuates switches I10, I2, I''2, I'1, I1 and I'2) both dogs D1 and D2 being mounted on the reciprocating part.

Switches I9 and I10 are actuated directly by dogs D1 and D2, respectively, shortly before the end of the cutting or return strokes. Switches I1, I'1, I2, I'2, I''2, are operated through a reversing lever L which rocks about a central pivot point during the reversing operation. During the cutting operation, reversing lever L assumes the position shown; as dog D1, moving in the cutting direction as indicated by the arrow C, passes over reversing lever L, the lever L is rocked to the right until it assumes the position L' indicated in dashed lines. The reversing lever remains in the position L' until the end of the return stroke, when it is rocked to the left to position L by the dog D2. During the rocking interval at the end of each stroke, both the cutting stroke relay 25 and the return stroke relay 26 are deenergized and the armature of motor 2 is connected to a resistance 32. As the motor 2 rotates to a stop, it acts as a generator and it experiences a deceleration because of the loss of energy in dissipating resistance 32. By the time the reversing lever L has assumed a new position, motor 2 has come to a full stop. Either relay 25 or 26, depending upon the position of reversing lever L, starts motor 2 once more.

The four switches I5, I6, I7 and I8 are operated by dogs D4 and D3 to produce the desired acceleration and deceleration during the cutting stroke, but the actuation of these switches affects the operation of the part only during automatic operation and only if two or more work surfaces are being cut with a period of fast speed between the successive cuts during the cutting stroke.

For the purpose of describing the various parts of the machine and their operation, it will be assumed that it is desired to machine a first work surface during the first half of the cutting stroke and a second work surface during the last half of the cutting stroke with a period of fast speed travel between the successive work surfaces.

As the machine travels to the left (as seen in Fig. 2) in the direction of arrow C, during the cutting stroke, the cutting tool enters the first work surface before the table T has been accelerated above a safe tool entrance speed. Table T continues to accelerate to a cutting speed selected by slider 7'a, makes most of the cut at cutting speed until dog D3 depresses the following switches in the sequence listed:

I8 is the first deceleration switch and energizes relay 17 thus closing contactor 17a and placing resistance 15 in the motor field control circuit so as to have a deceleration effect which is a function of the motor speed as will be described hereinafter.

I7 is the maximum field switch and energizes relay 34, which closes contactor 34a and short circuits the entire field control resistance circuit. This increases the motor field to its full strength and decreases the motor speed to a minimum speed suitable for exit of the cutting tool from the work surface. Actually, the field corresponds to a speed much lower than tool exit speed but before this very low speed is reached the tool makes its exit and the table is accelerated to fast speed.

I5 is a fast speed switch that opens when depressed by dog D3, thus deenergizing relay 33. The deenergization of relay 33 has the effect of shifting the field excitation current from slider 7'a, which has caused the motor 2 to run at cutting speed during the first cut, to slider 7"a which causes motor 2 to run at fast speed. Thus, as dog D4 passes over switch I5, switches I7 and I8 having again resumed their open position, motor 2 is accelerated to fast speed.

As the machine tool approaches the entrance point of the second work surface, it is decelerated to a safe tool entrance speed by dog D3 which depresses the following switches in the sequence listed:

I8 which acts as described above.

I7 which acts as described above.

I6 is a cutting speed switch which closes when depressed by dog D4, thus energizing relay 33. The energization of relay 33 has the effect of shifting the field excitation current from slider 7"a, which causes motor 2 to run at fast speed, to slider 7'a which causes motor 2 to run at its cutting speed.

Motor 2 drives the table T at cutting speed until the tool approaches the point of exit from the second work surface, at which time it is decelerated for reversal with such rapidity that it is traveling at a safe tool exit speed at the time of exit.

The selective operation of switches I5, I6, I7 and I8 by dogs D3 and D4 may be accomplished in any desired manner; a well known arrangement of three transversely offset paths is illustrated in Fig. 3 in which, the switches I7 and I8 are in the middle path and are actuated by both dogs D3 and D4, while the switch I5 is in the path of dog D3 only and the switch I6 is in the path of dog D4 only.

Figure 4:
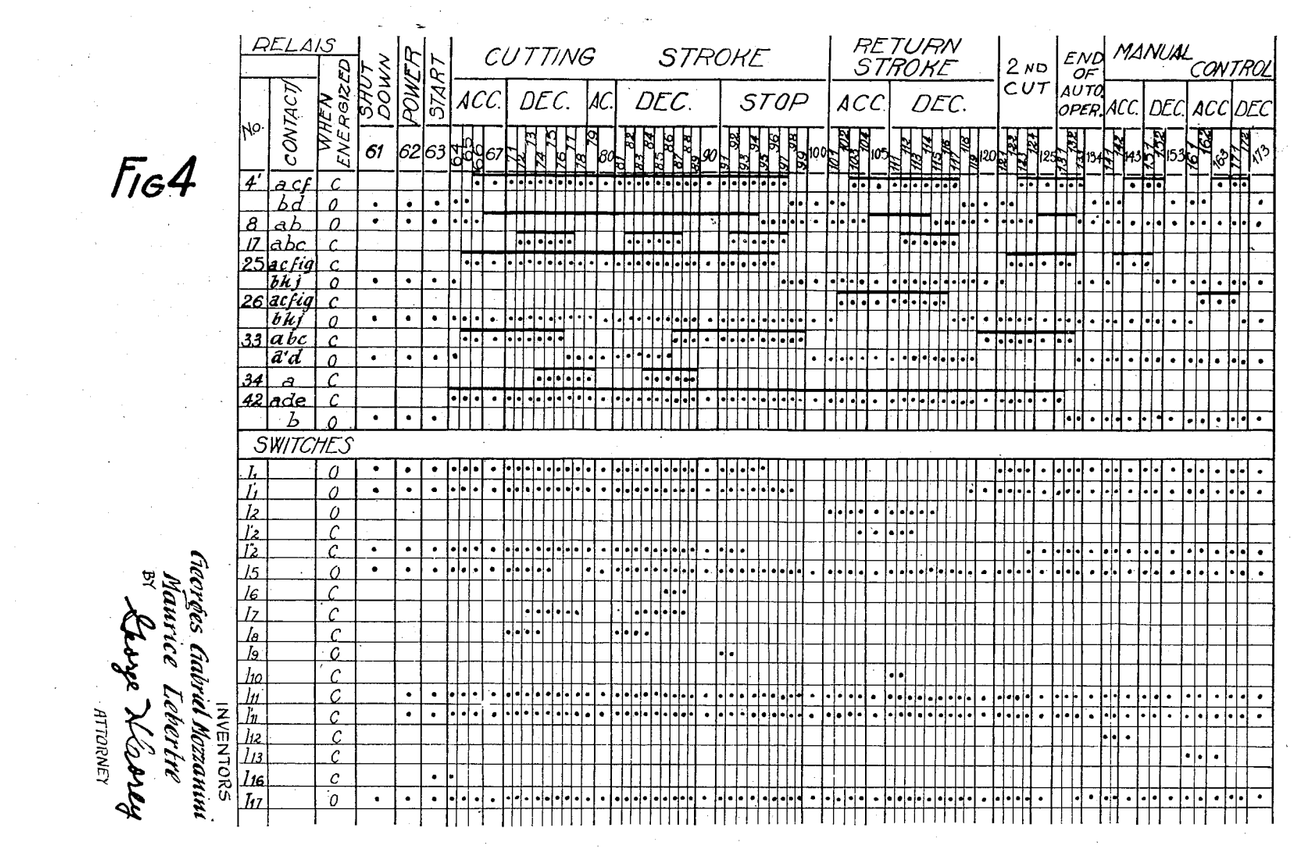
Fig. 4 is a chart of the operations of Fig. 2.

The sequence of operation for each of the switches I1 to I17 and the relays which they control may be determined from the chart in Fig. 4.

Under relays in the column designated "No," the number identifying each relay is given. In the column designated "Contacts" opposite each relay number are the letters which indicate the contacts operated by the particular relay. Those contacts which are closed when the relay is energized have a "C" opposite them in the column designated "when energized" and those are opened when the relay is energized having an "O" opposite them in said column.

The vertical columns numbered 61 to 173 show the conditions of the relays and switches at various points in the sequence of operation. The heavy horizontal line opposite each relay number indicates the periods in which it is energized. A black dot opposite a contact letter or switch letter indicates closure. The absence of any dot indicates that the particular contact or switch is open.

The functions of the seven relays listed are briefly as follows:

4' is a series field short circuiting relay which is provided to short-circuit series field 1' at all times except at acceleration from a stop; when motor 2 is being accelerated from start or after each reversal relay 4' is deenergized for a short period so that series field 1' may provide extra torque.

8 is an intermediate speed relay which is deenergized from shortly before until after each reversal in order to short circuit most of the variable field resistance and thereby limit the speed of motor 2. It is actuated indirectly by the reversing lever to provide entering and exit speeds at each reversal and its special purpose will be explained in a subsequent paragraph.

17 is a first deceleration relay for paralleling resistance 15 with the variable field resistance in each deceleration step, by I8 between reversals or by I9 or I10 at reversal.

25 is a cutting stroke relay which connects the control circuit for cutting stroke operation.

26 is a return stroke relay which connects the control circuit return stroke.

33 is a slider exchanging relay which transfers the field current from slider 7'a to slider 7"a when energized by switch I6 to cause an increase in motor speed from cutting speed to fast speed.

34 is a maximum field relay which is energized by switch I7 in order to short circuit resistance 7 and 15, thereby causing motor 2 to decelerate at a maximum rate for tool exit and tool entrance except at reversal. This relay, like dogs $I_5$, $I_6$, $I_7$ and $I_8$, is employed only for deceleration when two or more work surfaces are cut in one cutting stroke.

42 connects the control circuit for automatic operation at all times that switch $I_{16}$ is depressed.

When the machine is not being used the condition of "Shut down" column 61 applies. When power is disconnected by means of switches $I_{11}$ and $I'_{11}$ the condition of 62 exists. When the machine is started in automatic operation by closing switch $I_{16}$ column 63 applies. During the first cutting stroke the table first slowly approaches the tool entrance into the first work surface, enters the surface, accelerates to cutting speed, decelerates to exit speed, accelerates to fast speed, decelerates for entering the second work surface, accelerates to cutting speed, then decelerates for tool exit and reversal. The number of each operation column and a description of each operation during automatic operation is as follows:

| No. of operation | Description of operation |
|---|---|
| 63 | Closing automatic operation switch $I_{16}$ to energize relay 42. |
| 64 | Energization of relay 42, to connect the control circuit for automatic operation. |
| 65 | Energization of cutting direction relay 25. The table begins to move as the closing of cutting direction relay 25 energizes relay 33. |
| 66 | After 33 is energized and table has begun to move, energization of relay 4' in order to short circuit series field I provided for starting torque. |
| 67 | Relay 8 is energized and contactor 8a is opened so that the variable resistance 7 is no longer short circuited. Column 67 indicates the relay and switch positions for the period of operation at cutting speed. |
| | As the end of the cut is approached the action of dog D3 on switches $I_8$, $I_7$ and $I_6$ decelerates the table to safe tool exit speed as follows: |
| 71 | Closure of $I_8$ to place resistance 15 in parallel with speed controlling resistance 7 thus increasing the field of the motor 2 and decreasing its speed. |
| 72 | Excitation of relay 17 for the first deceleration. |
| 73 | Closure of maximum field contact $I_7$ by dog D3. |
| 74 | Excitation of relay 34 causing all field resistances to be short circuited. |
| 75 | Opening of contact $I_8$. This opening does not deenergize relay 17 since relay 17 is now energized by relay contact 33b. |
| 76 | Opening of $I_5$; remains open temporarily while steps 77 and 78 occur. |
| 77 | Deenergization of relay 33 results from the opening of $I_5$ and slider 7''a is replaced by slider 7'a. |
| 78 | Deenergization of relay 17, as a result of the opening of relay contact 33b. |
| 79 | Opening of maximum field switch $I_7$ and closing of switch $I_5$. |
| 80 | Deenergization of maximum field relay 34 results when $I_7$ opens and the machine runs at fast speed. |
| | Note.—Steps 75 through 78 have no effect on the motor field but merely prepare the control circuit so that when step 79 occurs, the fast speed of step 80 follows. As the cutting tool approaches the second work surface, dog D3 actuates switches $I_8$, $I_7$, and $I_6$ as follows: |
| 81 | Closing of first deceleration switch $I_8$. |
| 82 | Energization of relay 17 by the closure of switch $I_8$. This causes the first deceleration step as in the case of operation number 72. |
| 83, 84, 85 | Same as operations Number 73, 74 and 75. |
| 86 | Closing of switch $I_6$. |
| 87 | Energization of relay 33 resulting from closure of switch $I_6$. |
| | The energization of relay 33 transfers the motor field current from slider 7''a to 7'a, thus preparing the motor for operation at cutting speed. |
| 88 | The energization of relay 33 opens contact 33d and therby reopens contact 17a by deenergizing relay 17. |
| 89 | Opening of $I_7$ and, slightly thereafter, of $I_6$. |
| 90 | Deenergization of maximum field relay 34 results when $I_7$ opens; the machine runs at cutting speed. |
| | Note.—Steps 85 through 88 have no effect on the motor field, but merely prepare the control circuit so that when step 79 occurs, the cutting speed of step 90 follows. |
| 91 | Closing the first deceleration switch $I_9$. |
| 92 | Energization of first preparation relay 17. |

| No. of operation | Description of operation |
|---|---|
| 93 | Opening of first deceleration switch $I_9$. This opening does not deenergize relay 17 which is self-energized through 17b. |
| 94 | Reversing lever L begins to be actuated; opening of contact $I''_2$. |
| 95 | Deenergization of intermediate speed relay 8. |
| 96 | Opening of switch $I_1$. |
| 97 | Deenergization of cutting direction relay 25. Armature current passes through dissipating resistance 32. |
| 98 | Deenergization of relay 4'. Deenergization of first deceleration relay 17. |
| 99 | Opening of switch $I'_1$. |
| 100 | Deenergization of slider relay 33 (slider 7''a). End of cutting stroke. |
| 101 | Closing of switch $I_2$. |
| 102 | Energization of relay 26 (return direction). |
| 103 | Energization of relay 4'. |
| 104 | Closing of switch $I'_2$. End of actuation of reversing lever, which now assumes position L'. |
| 105 | Energization of intermediate speed relay 8. Operation at fast speed. |
| 111 | Closing of first deceleration on contact (return direction) $I_{10}$. |
| 112 | Energization of first preparation relay 17. |
| 113 | Opening of first deceleration switch $I_{10}$ (relay 17 remains energized). |
| 114 | The reversing lever (lever in L' position) begins to be actuated; opening of switch $I'_2$. |
| 115 | Deenergization of intermediate speed relay 8. |
| 116 | Opening of switch $I_2$. |
| 117 | Deenergization of return direction relay 26. Armature current passes through dissipating resistance 32. |
| 118 | Deenergization of relay 4'. Deenergization of first deceleration relay 17. |
| 119 | Closing of switch $I'_1$. |
| 120 | Energization of slider relay 33 (slider 7'a is connected). End of stroke. |
| 121 | Closing of switch $I_1$. |
| 122 | Energization of relay 25 (cutting direction). |
| 123 | Energization of relay 4'. |
| 124 | Closing of contact $I''_2$. End of reversing operation lever L now in cutting position. |
| 125 | Position identical to position 67. For stopping automatic operation. |
| 131 | Opening of $I_{17}$. |
| 132 | Deenergization of automatic operation relay 42. |
| 133 | Deenergization of relay 25. Deenergization of slider relay 33. Deenergization of relay 8. |
| 134 | Deenergization of relay 4'. This position is identical to position 61. End of automatic operation. |
| | Manual control operations are as follows: |
| 141 | Manual closing of $I_{12}$. |
| 142 | Energization of 25 (cutting direction). |
| 143 | Energization of relay 4'. Table T moves in the cutting direction at the end of the stroke. |
| 151 | Manual opening of $I_{12}$. |
| 152 | Deenergization of 25. |
| 153 | Deenergization of relay 4'. Cutting stroke ends. |
| | For return: |
| 161 | Manual closing of $I_{13}$. |
| 162 | Energization of 26 (return direction). |
| 163 | Energization of relay 4'. Table T moves in return direction at the end of the stroke. |
| 171 | Manual opening of $I_{13}$. |
| 172 | Deenergization of relay 26 (braking). |
| 173 | Deenergization of relay 4'. End of the manual operation. |

It will be seen from the above sequence of operations that the machine operates at either cutting speed or fast speed for most of its cycle. The cutting speed in a particular case will be determined by the type of metal being cut and by the type of cut which it is desired to make; the field control resistance must therefore be adjustable to a variety of cutting speeds. Similarly, the fast speed employed between cuts will vary from one set-up to another. Regardless of cutting speed or fast speed, however, the machine must operate in such a manner so as to decelerate to a stop at points determined solely by the setting of the reversing dogs D1 and D2. This is accomplished in the present machine since each deceleration prior to a reversal occurs in three steps as follows:

1. A switch (either $I_9$ or $I_{10}$) energizes relay 17, causing the closure of contract 17a. This action parallels the current carrying portion of the variable field resistance 7 with a parallel resistance comprised of the sum of resistance 15 and the hitherto-unused portion 13 of the variable resistance 7. The deceleration effect produced is relatively great when the speed of motor 2 is high (i. e. resistance 13 is small), and relatively small when the speed of motor 2 is low (i. e. resistance 13 is large).

2. A switch (either I''2 or I'2) is opened by the rocking of lever L so as to deenergize intermediate speed relay 8. The object of the present step is to decelerate the motor to an intermediate speed which is very nearly the same in every case, and is preferably the minimum speed of motor 2, thus eliminating such differences in speed which may exist from one case to another after step 1.

3. A switch (either I1 or I2) deenergizes a relay (25 or 26 respectively); this disconnects the armature of motor 2 from the source of power and connects it to dissipating resistance 32. It will be seen that step 3 always occurs under a standard condition, i. e. with motor 2 rotating at intermediate speed. As a result the motor comes to a stop within a standard distance relative to the position of dogs D1 and D2, regardless of operating speed prior to deceleration.

The momentary decelerations required for safe tool exit and entrance speeds when several work surfaces are machined in a single stroke, are accomplished with rapidity and accuracy by momentarily short-circuiting the motor field.

In Fig. 2 is shown a resistance 11 which is placed in parallel with the variable resistance 7 by contact 12a at all times, except during periods of acceleration. During periods of acceleration, relay 12 is deenergized by the opening of contact 4'f, thus disconnecting resistance 11 reducing the motor field excitation, and producing rapid acceleration of the motor. Contact 4'f is permitted to open and provide the accelerating effect whenever relay 4' is deenergized by the opening of either contact 25c or 26c. Contact 4'f is retarded in its closing by time delay device 5, which may be of any suitable type.

It is apparent from the above general description and from the details given with reference to a particular form of execution of our invention with reference to Figs. 1 to 5, inclusive, that numerous advantages may be derived from the automatic appliances according to our invention when used with motors the speed of which is field-controlled. Said advantages have been set forth in the above description and may be summed up as follows: powerful starting, rapid increase in speed, quick braking, accuracy in the stopping together with independence of the length of stroke of the controlled part with reference to the speed applied and possibility of associating if required, an indicator of travel, execution of short strokes without abnormal stress being laid on the material, automatic limitation of the adjustment of the minimum speeds to the value applicable for very short strokes, increased safety of operation, regular scale of speeds shown directly by the field rheostat, economy in expense of current, lastly possibility of obtaining automatically different combinations of speeds.

It has also been shown for certain particular cases such as the application of a motor with improved auxiliary appliances according to our invention, to the control of planing machines, how important the advantages provided by the invention are. Obviously said invention is not limited to the particular examples which have been described and it is capable of the most varied applications; it may be used chiefly, but not exclusively, for the control of machines operating with a reversal of motion.

It is also obvious that certain parts may be modified, left out or replaced by other equivalent parts, in particular in view of their application to a particular problem of the features of our invention, without the general character thereof being modified.

What we claim is:

1. In combination with a movable part, a direct current motor adapted to drive said part, a power supply supplying armature current to said motor; means for rapidly decelerating said motor to a stop upon the failure of said power supply which includes: an auxiliary circuit adapted to connect the armature of said motor to its field winding; electrical control means adapted to establish said auxiliary circuit to effect connection of said armature to said field winding upon the failure of said power supply, and a reversing switch in said auxiliary circuit responsive to a direction of current in said motor armature and adapted to direct said motor armature current through said field in the decelerating direction regardless of the direction of said armature current.

2. In apparatus for controlling the operation of a direct current motor, the combination with the armature of said motor, a shunt field winding of the motor, and means providing an excitation supply, of electrical control means for connecting and disconnecting said shunt field winding to and from said excitation supply, means responsive to a predetermined reduction in the potential of said excitation supply for actuating said electrical control means to effect disconnection of said shunt field winding from said excitation supply and concomitantly to connect said shunt field winding to said armature of said motor, and means cooperating with said potential responsive means and responsive to the direction of the current in said armature for effecting said connection of said shunt field winding to said armature so as to deliver an excitation current from said armature flowing in said shunt field winding in the same direction as that produced by the potential of said excitation supply.

3. In apparatus for controlling the operation of a direct current motor, the combination with the armature of said motor, a shunt field winding of said motor, means providing a power supply, means providing an excitation supply, and switch means for connecting and disconnecting the armature of said motor to and from said power supply for effecting running and stopping thereof, of electrical control means for connecting and disconnecting said shunt field winding to and from said excitation supply, means responsive to a predetermined reduction in the potential of said excitation supply for actuating said electrical control means to effect disconnection of said shunt field winding from said excitation supply and concomitantly to connect said shunt field winding to said armature of said motor, means cooperating with said potential responsive means and responsive to the direction of the current in said armature for effecting said connection of said shunt field winding to said armature so as to deliver an excitation current from said armature flowing in said shunt field winding in the same direction as that produced by the potential of said excitation supply, and means cooperating with said switch means and with said electrical control means and operated upon actuation of said means responsive to a predetermined reduction in the potential of said excitation supply for disconnecting said armature from said power supply upon connection of said shunt field winding to said armature.

4. In apparatus for controlling the operation of a direct current motor, the combination with the armature of said motor, a shunt field winding of said motor, means providing a power supply, means providing an excitation supply, switch means for connecting and disconnecting the armature of said motor to and from said power supply for effecting running and stopping thereof, and a braking resistance connectible across the armature of said motor to effect braking action thereon, of electrical control means for connecting and disconnecting said shunt field winding to and from said excitation supply, means responsive to a predetermined reduction in the potential of said excitation supply for actuating said electrical control means to effect disconnection of said shunt field winding from said excitation supply and concomitantly to connect said shunt field winding to said armature of said motor, and means cooperating with said potential responsive means and responsive to the direction of the current in said armature for effecting said connection of said shunt field winding to said armature so as to deliver an excitation current from said armature flowing in said shunt field winding in the same direction as that produced by the potential of said excitation supply, and means cooperating with said switch means and with said electrical control means and operated upon actuation of said means responsive to a predetermined reduction in the potential of said excitation supply for disconnecting said armature from said power supply upon connection of said shunt field winding to said armature and concomitantly to establish the connection of said braking resistance across said armature.

5. In apparatus for controlling the operation of a direct current motor, the combination with the armature of said motor, a shunt field winding of said motor, means providing a power supply, and switch means for connecting and disconnecting the armature of said motor to and from said supply for effecting running and stopping thereof, of a control contact, means actuated upon operation of said switch means to connect said motor to said supply for operating said control contact to close a circuit which when otherwise complete connects said shunt field winding across said armature of said motor to establish said circuit so as to maintain by virtue of the counterelectromotive force the excitation of said motor in the same direction as that produced by said supply, an auxiliary contact in said circuit, means responsive to the potential of said supply for actuating said auxiliary contact to interrupt said circuit during maintenance of said supply potential and concomitantly to connect said shunt field winding to said supply, and means responsive to a predetermined reduction in the potential of said supply for deactuating said auxiliary contact to close said circuit and to disconnect said shunt field winding from said supply, said control contact operating means being connected to the armature of said motor so as to be responsive to said counterelectromotive force thereof to maintain said control contact operated to maintain said circuit closed while said motor continues to operate.

6. The combination as defined in claim 5, which comprises a braking resistance connectible across the armature of the motor to effect deceleration and stopping of the motor, means actuated upon said predetermined reduction of the supply potential for operating said switch means to disconnect said armature of said motor from said supply, and means operated upon operation of said switch means to disconnect said motor from said supply for establishing connection of said braking resistance across said armature concomitantly with completion of said circuit from the armature of said motor through said shunt field thereof.

GEORGES GABRIEL MOZZANINI.
MAURICE LEBERTRE.

REFERENCES CITED

The following references are of record in the file of this patent:

UNITED STATES PATENTS

| Number | Name | Date |
|---|---|---|
| 657,416 | Ihlder | Sept. 4, 1900 |
| 793,768 | Carichoff | July 4, 1905 |
| 851,239 | Ihlder | Apr. 23, 1907 |
| 1,089,658 | Mason | Mar. 10, 1914 |
| 1,124,189 | Whittingham | Jan. 5, 1915 |
| 1,156,415 | Lindquist | Oct. 12, 1915 |
| 1,252,897 | Foster | Jan. 8, 1918 |
| 1,288,418 | Ihlder | Dec. 17, 1918 |
| 1,311,208 | Blood | July 29, 1919 |
| 2,340,060 | King et al. | Jan. 25, 1944 |
| 2,398,346 | Anderson | Apr. 16, 1946 |